(12) United States Patent
Soundararajan et al.

(10) Patent No.: US 11,403,628 B2
(45) Date of Patent: Aug. 2, 2022

(54) AUTHENTICATING AND PAYING FOR SERVICES USING BLOCKCHAIN

(71) Applicant: Hewlett Packard Enterprise Development LP, Houston, TX (US)

(72) Inventors: Abilash Soundararajan, Bangalore (IN); Michael Reid Tennefoss, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 302 days.

(21) Appl. No.: 16/757,714

(22) PCT Filed: Oct. 20, 2017

(86) PCT No.: PCT/US2017/057560
§ 371 (c)(1),
(2) Date: Apr. 20, 2020

(87) PCT Pub. No.: WO2019/078880
PCT Pub. Date: Apr. 25, 2019

(65) Prior Publication Data
US 2021/0201396 A1 Jul. 1, 2021

(51) Int. Cl.
*G06Q 20/38* (2012.01)
*G06Q 10/10* (2012.01)
(Continued)

(52) U.S. Cl.
CPC ............ *G06Q 20/38* (2013.01); *G06Q 10/10* (2013.01); *G06Q 20/0655* (2013.01);
(Continued)

(58) Field of Classification Search
CPC ............... G06Q 20/38; G06Q 20/0655; G06Q 20/3829; G06Q 20/388; G06Q 20/407;
(Continued)

(56) References Cited

U.S. PATENT DOCUMENTS 8,042,163 B1 10/2011 Karr et al.
9,569,771 B2 2/2017 Lesavich et al.
(Continued)

FOREIGN PATENT DOCUMENTS

CN 105659558 A 6/2016
CN 109417465 A 3/2019
(Continued)

OTHER PUBLICATIONS

Kiviharju ("Enforcing Role-Based Access Control with Attribute-Based Cryptography in MLS Environments", Puolustusvoimien tutkimuslaitos, Jun. 13, 2017, 237 pages) (Year: 2017).*
(Continued)

*Primary Examiner* — James D Nigh
(74) *Attorney, Agent, or Firm* — Trop, Pruner & Hu, P.C.

(57) ABSTRACT

In some examples, in an authentication session for authenticating an entity associated with a client device to access a service, a server system is to receive, from the client device, identification information associated with the client device, and verify, using a blockchain network, an existence of the identification information. The server system is to send, to the client device, payment information regarding payment for the service, and receive, from the client device, a token as payment for the service.

20 Claims, 4 Drawing Sheets

(51) Int. Cl.
*G06Q 20/06* (2012.01)
*G06Q 20/40* (2012.01)
*G06Q 30/00* (2012.01)
*G06Q 40/02* (2012.01)
*H04L 9/30* (2006.01)
*H04L 9/32* (2006.01)
*H04L 9/40* (2022.01)
*G06Q 20/36* (2012.01)

(52) U.S. Cl.
CPC ....... *G06Q 20/388* (2013.01); *G06Q 20/3829* (2013.01); *G06Q 20/407* (2013.01); *G06Q 30/01* (2013.01); *G06Q 40/02* (2013.01); *H04L 9/30* (2013.01); *H04L 9/3271* (2013.01); *H04L 63/0876* (2013.01); *H04L 63/162* (2013.01); *G06Q 20/36* (2013.01); *G06Q 2220/00* (2013.01); *H04L 2209/38* (2013.01); *H04L 2209/56* (2013.01)

(58) Field of Classification Search
CPC ........ G06Q 20/36; G06Q 10/10; G06Q 30/01; G06Q 40/02; G06Q 2220/00; H04L 9/30; H04L 9/3271; H04L 63/0876; H04L 63/162; H04L 2209/38; H04L 2209/56
USPC .......................................................... 705/71
See application file for complete search history.

(56) References Cited

U.S. PATENT DOCUMENTS

| | | | |
|---|---|---|---|
| 9,635,000 | B1 | 4/2017 | Muftic |
| 9,648,007 | B1 | 5/2017 | Sterling et al. |
| 9,722,790 | B2 | 8/2017 | Ebrahimi |
| 9,980,137 | B2 | 5/2018 | South et al. |
| 10,194,320 | B1* | 1/2019 | Egner ................... H04L 9/0819 |
| 2005/0015591 | A1 | 1/2005 | Thrash et al. |
| 2006/0236382 | A1 | 10/2006 | Hinton et al. |
| 2012/0150750 | A1 | 6/2012 | Law et al. |
| 2013/0104211 | A1 | 4/2013 | Nandakumar |
| 2013/0333009 | A1 | 12/2013 | Mackler |
| 2014/0059213 | A1 | 2/2014 | Ollikainen et al. |
| 2014/0215594 | A1 | 7/2014 | Lambert |
| 2014/0380040 | A1 | 12/2014 | Albahdal et al. |
| 2016/0055322 | A1 | 2/2016 | Thomas |
| 2016/0088424 | A1 | 3/2016 | Polo et al. |
| 2016/0342989 | A1 | 11/2016 | Davis |
| 2017/0076306 | A1 | 3/2017 | Snider et al. |
| 2017/0091397 | A1 | 3/2017 | Shah |
| 2017/0132619 | A1 | 5/2017 | Miller et al. |
| 2017/0132620 | A1 | 5/2017 | Miller et al. |
| 2017/0132625 | A1 | 5/2017 | Kennedy |
| 2017/0132630 | A1 | 5/2017 | Castinado et al. |
| 2017/0134429 | A1 | 5/2017 | Gustafsson |
| 2017/0163733 | A1 | 6/2017 | Grefen et al. |
| 2017/0177898 | A1 | 6/2017 | Dillenberger |
| 2017/0228371 | A1 | 8/2017 | Seger, II |
| 2017/0230375 | A1 | 8/2017 | Kurian |
| 2017/0230791 | A1 | 8/2017 | Jones |
| 2017/0232300 | A1 | 8/2017 | Tran et al. |
| 2017/0236123 | A1 | 8/2017 | Ali et al. |
| 2017/0243208 | A1 | 8/2017 | Kurian et al. |
| 2017/0262902 | A1 | 9/2017 | Weston et al. |
| 2017/0302450 | A1 | 10/2017 | Ebrahimi |
| 2017/0330174 | A1 | 11/2017 | Demarinis et al. |
| 2018/0060496 | A1 | 3/2018 | Bulleit et al. |
| 2018/0174122 | A1 | 6/2018 | Mattingly et al. |
| 2018/0182052 | A1 | 6/2018 | Panagos |
| 2018/0316502 | A1 | 11/2018 | Nadeau et al. |
| 2018/0337771 | A1 | 11/2018 | Baker et al. |
| 2018/0349572 | A1 | 12/2018 | Chen et al. |
| 2019/0081796 | A1 | 3/2019 | Chow et al. |
| 2019/0215162 | A1 | 7/2019 | Dickenson et al. |
| 2019/0268284 | A1* | 8/2019 | Karame ................ G06F 21/604 |
| 2019/0280875 | A1 | 9/2019 | Ragnoni et al. |
| 2019/0289019 | A1 | 9/2019 | Thekadath et al. |

FOREIGN PATENT DOCUMENTS

| | | |
|---|---|---|
| EP | 3200167 A1 | 8/2017 |
| EP | 3396576 A1 | 10/2018 |
| KR | 10-1701131 B1 | 2/2017 |
| KR | 10-1723405 B1 | 4/2017 |
| KR | 10-1767534 B1 | 8/2017 |
| WO | 2015/187608 A1 | 12/2015 |
| WO | 2016/202952 A1 | 12/2016 |
| WO | 2017/054985 A1 | 4/2017 |
| WO | 2017/079218 A1 | 5/2017 |
| WO | 2017/104899 A1 | 6/2017 |
| WO | 2017/107976 A1 | 6/2017 |
| WO | 2017/127564 A1 | 7/2017 |
| WO | 2017/131788 A1 | 8/2017 |

OTHER PUBLICATIONS

Extended European Search Report Received for EP Patent Application No. 17928996.2, dated May 4, 2021, 9 pages.
Extended European Search Report Received for EP Patent Application No. 17929402.0, dated Mar. 5, 2021, 8 pages.
Basic Attention Token, "Announcing a new Blockchain-Based Digital Advertising Platform", available online at <https://medium.com/@AttentionToken/announcing-a-new-blockchain-based-digital-advertising-platform-775203933c44>, Mar. 23, 2017, 4 pages.
Sitcoin Exchange Guide, "ATMChain—Smart Media Advertising Blockchain Network ICO?", available online at <https://bitcoinexchangeguide.com/atmchain/>, Aug. 16, 2017, 6 pages.
Blockchained Technology, "Data Storage with Blockchain Technology", available online at <http://blockchained.blogspot.in/2015/03/data-storage-with-blockchain-technology.html>, Mar. 17, 2015, 4 pages.
Ethereum, "When would it make sense to use node server for an application using smart contracts?", available online at <https://ethereum.stackexchange.com/questions/25830/when-would-it-make-sense-to-use-node-server-for-an-application-using-smart-contr>, Sep. 7, 2017, 4 pages.
Jai Singh Arun, "Reimagining the Future of Identity Management With Blockchain", available online at <https://securityintelligence.com/reimagining-the-future-of-identity-management-with-blockchain/>, Mar. 7, 2017, 6 pages.
Moinet et al., "Blockchain based trust & authentication for decentralized sensor networks", Jun. 6, 2017, pp. 1-6.
Peter Saint-Andre, "How can blockchains improve the Internet of Things?", available online at <https://coincenter.org/entry/how-can-blockchains-improve-the-internet-of-things>, Oct. 11, 2016, 8 pages.
Robert Hof, "How MetaX Plans to Use Blockchain to Stop Ad Fraud", available online at <https://www.forbes.com/sites/roberthof/2017/03/21/how-metax-plans-to-use-blockchain-to-stop-ad-fraud/#4088d01d59da>, Mar. 21, 2017, 2 pages.
Search Report and Written Opinion received for PCT Patent Application No. PCT/US2017/057554, dated Jul. 13, 2018, 14 pages.
Search Report and Written Opinion received for PCT Patent Application No. PCT/US2017/057556, dated Jul. 4, 2018, 8 pages.
Search Report and Written Opinion received for PCT Patent Application No. PCT/US2017/057558, dated Jul. 4, 2018, 9 pages.
Search Report and Written Opinion received for PCT Patent Application No. PCT/US2017/057560, dated Jul. 20, 2018, 12 pages.
Tran et al., "Regerator: a Registry Generator for Blockchain", CAiSE 2017 Forum and Doctoral Consortium Papers, 2017, pp. 81-88.

* cited by examiner

AUTHENTICATING AND PAYING FOR SERVICES USING BLOCKCHAIN

BACKGROUND

Electronic devices can access services over networks. For example, an electronic device can seek access to a network connectivity service by which the electronic device can establish a connection with a network and communicates with other devices over the network. The electronic device can be charged for use of the network connectivity service. In other examples, electronic devices can access other types of services.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

When an entity using a client device requests network access and purchases a service, both an authentication process and a payment process are performed. Performing separate authentication and payment processes, potentially with different servers, is complex and inefficient because of added auditing, latency, processing, configuration, update processes, support processes, energy consumption, and network utilization. In accordance with some implementations of the present disclosure, an integrated authentication and payment process is implemented that makes use of a blockchain as a database for both authenticating an entity using a client device and effecting payment for a service.

A "client device" can refer to any machine or program that is able to communicate over a network or with a server or application. A machine can refer to an electronic device, which can refer to any or some combination of the following: a processor, a smartphone, a tablet computer, a notebook computer, a desktop computer, a game appliance, or any other electronic device that is able to communicate over a network. A program can refer to any or some combination of the following: an application, an operating system, a boot program, or other machine-readable instructions.

An "authentication process" confirms the truth of an attribute of data (e.g., an identity of an entity, a credential, etc.). An "entity" using a client device and requesting access and service can refer to the client device itself, a user of the client device, an application, a component in the client device, or any other attribute associated with the client device. Such an entity can also be referred to as an entity associated with a client device. A "network" can refer to a system of client devices that are joined together, temporarily or continuously, so that they can exchange information and/or share resources, e.g., a client device may attempt to obtain network access by radio, wired, fiber optic, power line carrier, ultrasonic, and/or infrared network.

In addition to accessing a network connectivity service to establish a connection with a network, a client device can access other types of services, including, for example, a service to execute an application, a data storage service, a communication service over a network, and so forth.

A "payment process" can refer to a process by which the entity associated with the client device can make payment for accessing the service. In some example cases, an authentication process and a payment process are mutually exclusive processes, which is highly inefficient. For example, an authentication session can be established to allow a client device to obtain authentication while the payment process is performed in another session that is separate from the authentication session. Performing authentication and payment processes as separate processes that employ different servers can result inefficient use of resources, including machine resources, network resources, program resources, and/or storage resources.

Figure 1:
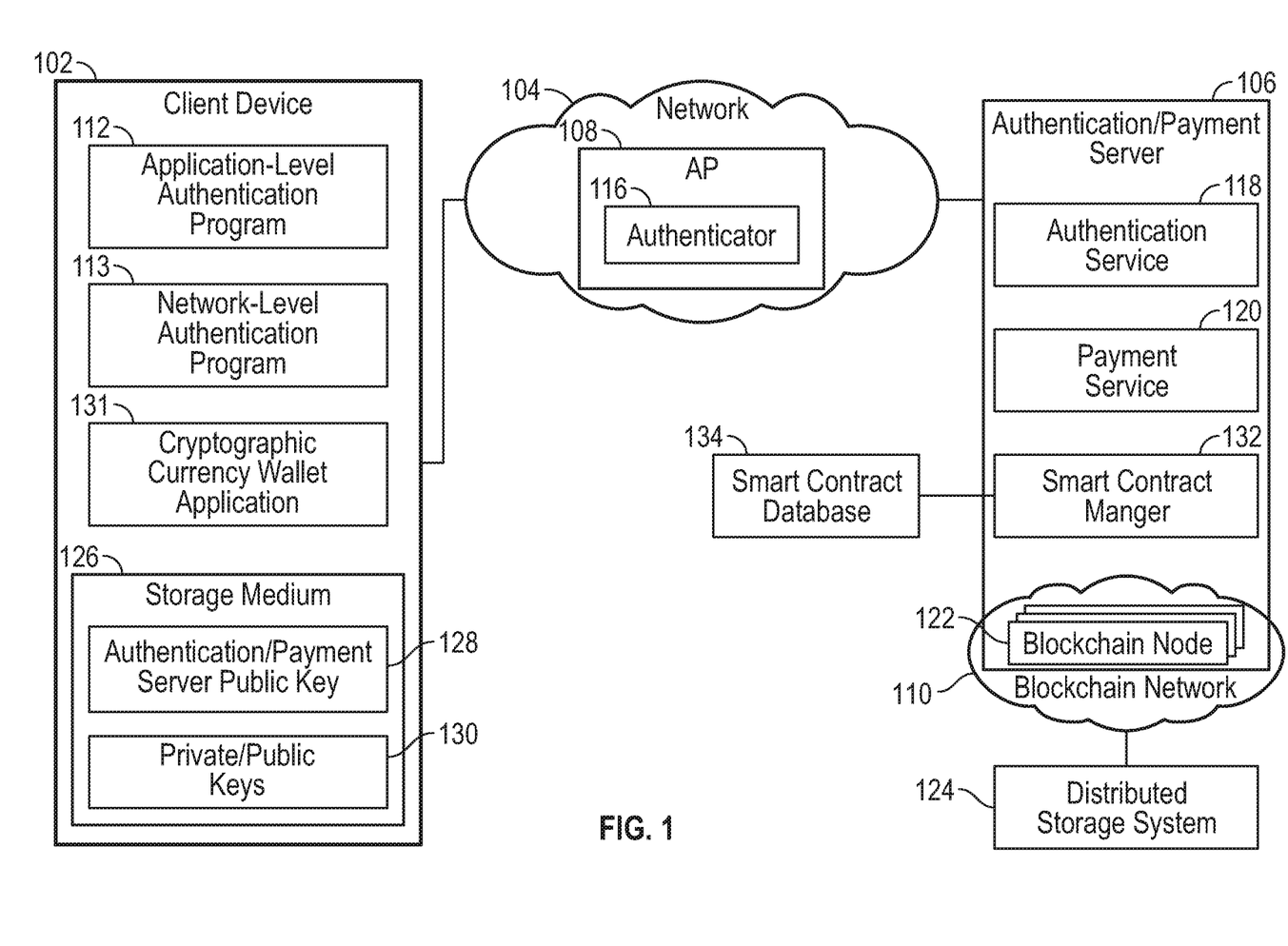
FIG. 1 is a block diagram of an arrangement according to some examples.

FIG. 1 is a block diagram of an example arrangement that includes a client device 102, a network 104, and an authentication/payment server 106. The network 104 can include a wireless network with which the client device 102 can communicate wirelessly. Alternately, the network 104 can include a wired network, or a combination of a wireless and wired network. The network 104 includes an access point (AP) 108, which is the network node with which the client device 102 can establish a connection for communication through the network 104 with another entity, such as the authentication/payment server 106.

Although just one client device 102, one AP 108, and one authentication/payment server 106 are shown in FIG. 1, it is noted that in other examples, multiple client devices 102, and/or multiple APs 108, and/or a multiple authentication/payment servers 106 can be provided.

In some examples, the AP 108 can be part of a wireless network (e.g., a Wi-Fi network). In other examples, the AP 108 can refer to a (Wide Area Network) WAN or Low power wide area network (LPWAN) base station or transmission system base station, another low power long range access network (e.g., Lora) node, or an access node of a cellular network.

The authentication/payment server 106 includes a computing node (or a distributed arrangement of computing nodes) to interact with a blockchain network 110, which can be used for both authenticating an entity using the client device 102 and effecting payment for a service that is being accessed by the client device 102.

Blockchain information is used in the context of blockchain technology. A blockchain refers to a distributed collection of records (referred to as "blocks") that are linked and secured cryptographically in a distributed manner. A blockchain can also refer to a continuous and unbroken ledger of blocks. The blocks of the blockchain can be distributed across a large number of computing devices. Each block can include various information, including transaction data for a transaction represented by the block, a timestamp, and a reference to a previous block in the blockchain. As new transactions occur, new blocks are created for the new transactions and added to the blockchain. A blockchain (which forms a distributed transaction ledger) records transactions among multiple entities in a verifiable and permanent way. Once a block is created and the data of the block recorded, the block cannot be altered without alteration of subsequent blocks.

Multiple entities can see the transaction ledger, but because of the decentralized nature of the distributed collection of blocks, records are protected against hacking or corruption by a malicious entity. Validation of each block that gets added to the blockchain is done by every node by validating its hash by applying a hashing function. If the validation fails, then that node drops the block from the blockchain.

A blockchain address can be assigned to an entity associated with the client device 102. A blockchain address refers to an identifier that is used in the blockchain. In some examples, a blockchain address is analogous to an account number. An entity (such as a user or a device) can include one blockchain address, or can have multiple blockchain addresses. In some examples, a blockchain address can be generated based on use of a pair of a public key and a private key associated with an entity.

More generally, a blockchain information can refer to any information that can be used in a blockchain process. A blockchain process can refer to a process that uses a blockchain to store transactions in blocks of the blockchain. A transaction can refer to any event (e.g., an activity, data storage, program execution, etc.).

The client device 102 includes an application-level authentication program 112 and a network-level authentication program 113. Generally, an authentication program can refer to machine-readable instructions that upon execution perform authentication on behalf of an entity associated with the client device 102. The network-level authentication program 113 exchanges messaging with an authenticator 116 (implemented as machine-readable instructions executable) in the AP 108 of the network 104 to initiate network-level authentication. The application-level authentication program 112 exchanges messaging with an authentication service 118 in the authentication/payment server 106 to perform an authentication process.

Although the authenticator 116 is depicted as being part of the AP 108 in FIG. 1, it is noted that in other examples, the authenticator 116 can be on a separate node, such as on the authentication/payment server 106 or on another network node.

The network-level authentication program 113 can initiate an authentication process by sending an authentication initiation message (e.g., an EAP message) to the authenticator 113 in the AP 108, and the authentication process can proceed based on further exchanges of messaging between the application-level authentication program 112 and the authentication service 118 of the authentication/payment server 106.

In alternate examples, of the network-level authentication program 113 and the application-level authentication program 112 being separate programs, the network-level authentication program 113 and the application-level authentication program 112 can be integrated into one authentication program.

In some examples, the network-level authentication performed by the network-level authentication program 113 includes a layer 2 (L2) authentication. For example, the L2 authentication can be according to the Extensible Authentication Protocol (EAP), which provides an authentication framework for transporting and usage of keying material and parameters (including keys for encryption and digital signatures). Although reference is made to EAP in some examples, it is noted that in other examples, other authentication protocols can be employed, such as Media Access Control (MAC) authentication, pre-shared key (PSK), MAC authentication with 802.1x authentication, Point-to-Point Protocol (PPP), HotSpot 2.0 authentication, among other examples. Also, although reference is made to performing an L2 authentication process between the authentication program 113 and the authenticator 116, it is noted that in other examples, other types of authentication processes can be used, including layer 3 (L3) authentication, layer 2 and 3 authentication, layer 1 (L1) authentication, or authentication at other layers. A layer n (n=1, 2, . . . ) authentication process refers to an authentication process that is performed by a particular layer within a protocol stack in respective nodes, which in the case of FIG. 1 includes the client device 102 and the AP 108.

The client device 102 further includes a payment program 114 to effect payment for a service that is being accessed by the client device 102. For example, the payment program 114 can be a cryptographic currency wallet application 113, which can be used to make payment for a transaction or to make payment for accessing data or to make payment for any other purpose Although FIG. 1 shows the authentication program 112 and the payment program 114 as being separate programs, it is noted that in other examples, the authentication program 112 and payment program 114 can be program, or alternately, the authentication programs 112, 113 and the payment program 114 can be integrated into one program. More generally, the authentication program(s) and payment program can include machine-readable instructions to perform authentication and payment.

The authenticator 116 in the AP 108 can interact with the network-level authentication program 113 to establish an authentication session to authenticate an entity associated with the client device 102 and to effect payment for access of a service by the client device 102.

Once an authentication session is established between the network-level authentication program 113 and the client device 102 and the authenticator 116 in the AP 108, the application-level authentication program 112 and the payment program 114 in the client device 102 can interact with the authentication service 118 and a payment service 120, respectively, in the authentication/payment server 106.

The authentication service 116 and the payment service 120 can be separate services or can be part of an integrated service. The authentication service 118 and payment service 120 can be implemented using machine-readable instructions executable in the authentication/payment server 106.

The application-level authentication program 112 can interact with the authentication service 118 in an authentication session to perform authentication of an entity associated with the client device 102. The payment program 114 can interact with the payment service 120 in the same authentication session to effect payment for a service that is being accessed by the client device 102. In accordance with some implementations of the present disclosure, both the authentication service 118 and the payment service 120 can access the blockchain network 110 to perform the authentication and payment.

In some examples, the authentication service 118 and payment service 120 of the authentication/payment server 106 can provide authentication and payment processes according to a Remote Authentication Dial-In User Service (RADIUS) protocol, which provides Authentication, Authorization, and Accounting (AAA) services. In other examples, the authentication/payment server 106 can implement other authentication and accounting protocols, such as Terminal Access Controller Access Control System (TACACS), Extended TACACS (XTACACS), TACACS+, and DIAMETER, among others.

The blockchain network 110 can include blockchain nodes 122 (also referred to as "full nodes"), which are distributed nodes that perform processing relating to the blockchain. The blockchain nodes 122 in some examples can be part of the authentication/payment server 106, such that at least a portion of the authentication/payment server 106 is considered to be part of the blockchain network 110.

In some examples, rather than store an actual data, a block of a blockchain may include a pointer to a storage location in a distributed storage system 124 (including a distributed arrangement of storage nodes, which can be referred to as a swarm in some examples) that stores the actual data corresponding to the block. The blocks of the blockchain can refer to multiple distributed storage systems 124 (multiple swarms) in other examples.

Blocks in the blockchain have some amount of information about each transaction, such as which accounts are involved, how much currency was transferred, some detail about the transaction, a timestamp representing a time of the transaction, some data and a reference to the external distributed storage system that contains additional data. A full node that is part of the blockchain network 110 can retrieve and share the additional data from the distributed storage system 124. The full node can send a retrieve request to the appropriate distributed storage system (e.g., 124) based on a blockchain address. The retrieve request is validated, and any charges for requesting and obtaining the requested data can be applied. Once validated and any charges collected, the requested data can be returned from the distributed storage system 124 to the full node, which sends the requested data to the authentication/payment server 106.

The client device 102 also includes a storage medium 126 that stores an authentication/payment server public key 128 (which is the public key of the authentication/payment server 106). The storage medium 126 can also store the private and public keys 130 of the client device 102. The authentication/payment server public key 124 and the private/public keys 130 can be pre-configured in the storage medium 126 of the client device 102 or can be obtained by the client device 102 from the authentication/payment server 106 or another entity.

Uses of the authentication/payment server public key 128 and the private/public keys 130 are discussed further below.

The client device 102 can also include a cryptographic currency wallet application 131, which can be used to make payment for a transaction or to make payment for accessing data or to make payment for any other purpose.

The authentication/payment server 106 can include a smart contract manager 132 (including machine-readable instructions) to manage smart contracts. In other examples, the smart contract manager 132 can be implemented in a computing node (or computing nodes) separate from the authentication/payment server 106.

The smart contract manager 118 implements enforcement of smart contracts, such as those stored in a smart contract database 134. A smart contract provides logic and rules executed by computing device(s) for a blockchain to automate terms of a contract among multiple entities. A smart contract can include blockchain addresses of the parties of the smart contract, information relating to terms of the smart contract, and other information.

In some examples, a smart contract can be established among the multiple entities, such as an entity associated with the client device 102 and an entity (e.g., a service provider) that provides a service that can be accessed by client devices. For example, the service provider can be a network service provider to provide a network connectivity service. In other examples, a smart contract can be established between an entity associated with the client device 102 and other service provider entities.

In further examples, an entity that requests access of a service can be part of a Distributed Autonomous Organization (DAO) with privileges, as specified according to rules of smart contracts, to obtain access to the service. The DAO groups entities granted access to a service. In such examples, the authentication of an entity associated with the client device 102 can be based on a combination tasks performed by the authentication service 118 and the smart contract manager 132. The smart contract manager 132 can consult a smart contract in the smart contract database 134 to ensure that the entity requesting access of the service is part of the DAO. The smart contract manager 132 can include contracts maintained for an organization for granting access and agreements for charges and options for various services offered. In such examples, techniques or mechanisms are provided where an entity requesting a service can make an advance payment for the service, and a refund can be issued to the entity if the service is partially used.

In other examples, instead of paying in advance for a service, an entity can pay for the service as the entity uses the service or after the entity has consumed the service. For example, an escrow account can be established where the parties to the escrow account can agree upon the amount (in the form of a cryptographic currency) to be deposited and a service provider withdraws money (in the form of a cryptographic currency) as services are consumed as per a smart contract. The foregoing functionalities can be achieved through a combination of authentication and blockchain-based processes.

Figure 2:
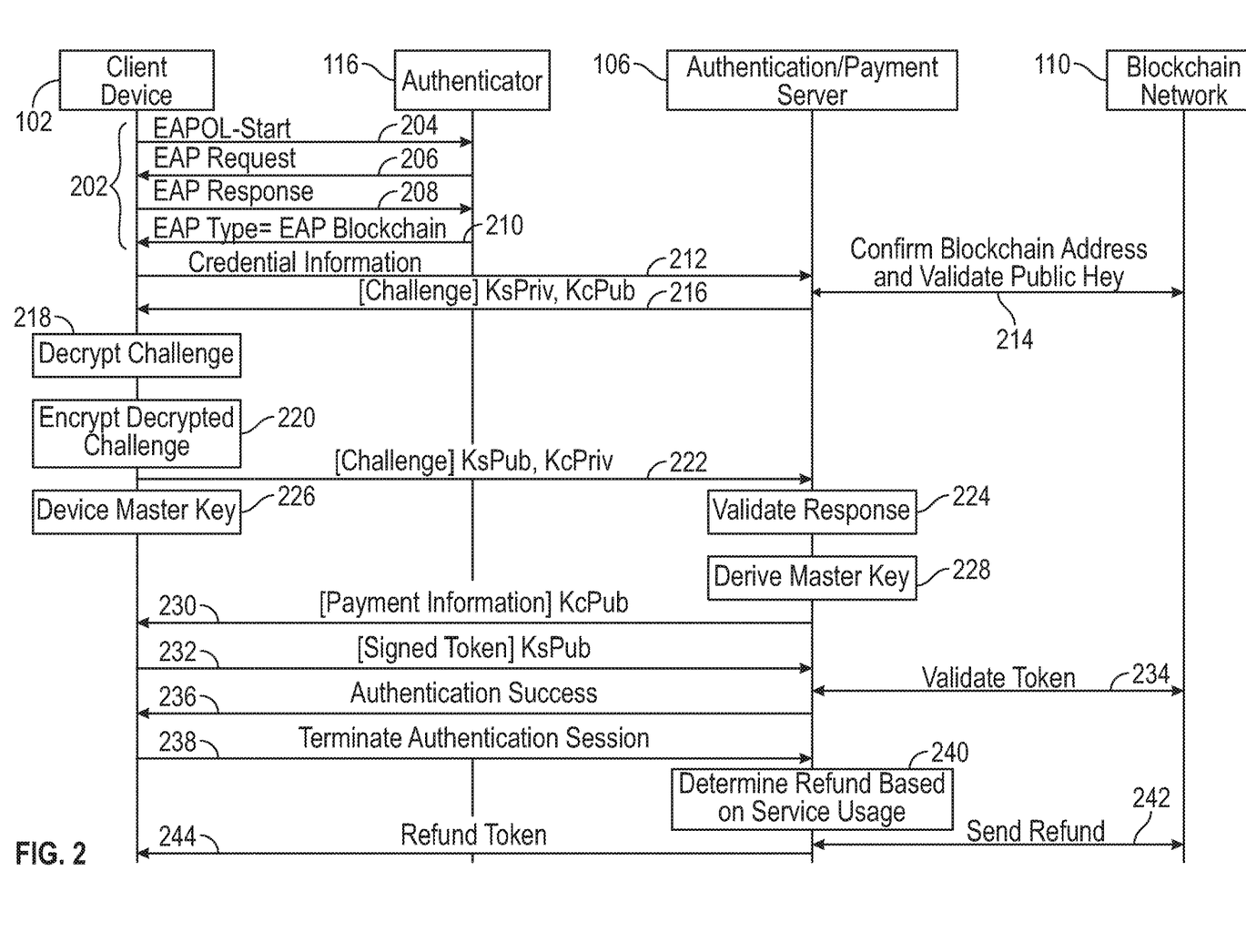
FIG. 2 is a message flow diagram of a process according to some examples.

FIG. 2 is a message flow diagram of an example process that can be performed among the client device 102, the authenticator 116, the authentication/payment server 106, and the blockchain network 110.

The client device 102 (more specifically, the network-level authentication program 113) exchanges (at 202) messages with the authenticator 116 to establish an authentication session. As noted above, the authentication session can include an L2 authentication session, such as one established according to EAP. In such examples, the messages that are exchanged at 202 include EAR messages. In other examples, messages according to other protocols can be exchanged between the client device 102 and the authenticator 116 to establish an authentication session.

The following describes messages exchanged between the client device 102 and the authenticator 116 in examples where EAR is used. The client device 102 sends (at 204) an EAPOL-Start request to the authenticator 116, which is sent to a special group multicast Medium Access Control (MAC)

address reserved for Institute of Electrical and Electronics Engineers (IEEE) 802.1 X authentication, to allow the client device 102 to determine whether an authenticator (e.g., 116) is present, and if present, to let the authenticator know that the client device 102 is ready to perform an authentication process.

In response to the EAPOL-Start request, the authenticator 116 sends (at 206) an EAR Request to the client device 102, where the EAR Request specifies a specific EAR Method (a type of EAR-based authentication) the authenticator 116 wishes the client device 102 to perform.

If the client device 102 agrees to the EAR Method indicated in the EAR Request, the client device 102 sends (at 208) an EAP Response to the authenticator 116. The authenticator 116 then sends (at 210) an EAR Request (or other EAR message) that includes an EAR Type information element set to an "EAR Blockchain" value. "EAT Type=EAP Blockchain" is an example of an indication that blockchain is to be used for performing authentication and payment. In other examples, other indications for using a blockchain for authenticating and payment can be sent by the authenticator 116 to the client device 102.

Although a specific exchange of messages according to some examples is shown in FIG. 2 for establishing an authentication session, it is noted that in other examples, other techniques for establishing an authentication session can be used in which the authenticator 116 sends an indication that blockchain is to be used for authentication and payment is sent to the client device 102.

In response to the indication received at 210, the client device 102 sends (at 212) credential information in an authentication request to the authentication/payment server 106. In examples according to FIG. 2, the credential information of the client device 102 includes a blockchain address of the client device 102 and a public key of the client device 102. As used here, a "blockchain address of a client device" can refer to the blockchain address of an entity associated with the client device, which can be the client device itself or a user of the client device, a program in the client device, a component in the client device, or any other attribute associated with the client device. More generally, the credential information can include identification information associated with the client device, where an example of the identification information includes a blockchain address.

In examples where the authentication/payment server 106 is a RADIUS server, then the credential information of the client device 102 can first be sent in an authentication request to a network access server, such as the AP 108, which forwards a RADIUS Access Request to the authentication/payment server 106. The RADIUS Access Request contains the credential information received from the client device 102. In other examples, the client device 102 can send the credential information directly from the client device 102 to the authentication/payment server 106 in a message.

In response to receiving the credential information, the authentication/payment server 106 accesses (at 214) the blockchain network 110 to confirm that the blockchain address in the received credential information is present in the corresponding blockchain, and to validate the public key in the credential information received from the client device 102. The blockchain address and the public key are sent by the authentication service 118 to the blockchain network 110. In response, a blockchain node 122 (full node) accesses the blocks of the corresponding blockchain to determine whether the blockchain address is present. If so, then that indicates that the blockchain address is valid. The blockchain node 122 also validates in the blockchain network 110 if the public key is valid for the blockchain address of the client device 102.

The authentication service 118 in the authentication/payment server 106 receives a response from the blockchain network 110, where the response can indicate whether or not the blockchain address in the received credential information is present in the blockchain. If present, then the authentication/payment server 106 can proceed with the remaining process shown in FIG. 2. However, if the blockchain address is not present in the blockchain database 110, then authentication is rejected and the authentication service 118 can send a failure indication back to the client device 102, such as in a RADIUS Access-Reject message.

Assuming that the blockchain network 110 confirms that the blockchain address of the entity associated with the wireless device 102 is in the blockchain, the authentication/payment server 106 sends (at 216) to the client device 102 an encrypted authentication challenge to the client device 102. The sending of an authentication challenge is part of a challenge-response authentication procedure in which a first entity (in this case the authentication/payment server 106) presents a question (challenge) and the second entity (in this case the client device 102) provides a valid answer (response) to be authenticated.

The encrypted authentication challenge sent by the authentication/payment server 106 is encrypted with a private key (KsPriv) of the authentication/payment server 106 and the public key (KsPub) of the client device 102 (which was included in the credential information sent by the client device 102 to the authentication/payment server 106).

The application-level authentication program 112 in the client device 102 receives the encrypted authentication challenge from the authentication/payment server 106, and decrypts (at 218) the received encrypted authentication challenge. The decryption of the encrypted authentication challenge is performed by the application-level authentication program 112 using a private key (KcPriv) of the client device 102 and the public key (KsPub) of the authentication/payment server 106. The public key (KsPub) of the authentication/payment server 106 is stored as 130 in the storage medium 126 of the client device 102 (as shown in FIG. 1).

The application-level authentication program 112 in the client device 102 then encrypts (at 220) the decrypted authentication challenge with the public key (KsPub) of the authentication/payment server 106 and the private key (KcPriv) of the client device 102. The encrypted authentication challenge (which forms the response to the challenge received from the authentication/payment server 106) is sent (at 222) from the client device 102 to the authentication/payment server 106. Upon receipt of the response from the client device 102, the authentication/payment server 106 validates (at 224) that the authentication challenge was successfully received by the client device 102 and then successfully decrypted and re-encrypted by the client device 102.

The validation includes the authentication service 118 of the authentication/payment server 106 decrypting the encrypted authentication challenge in the response received from the client device 102, where the decrypting uses the private key (KsPriv) of the authentication/payment server 106 and the public key (KcPub) of the client device 102. Once decrypted, the authentication service 118 compares the decrypted version of the authentication challenge from the client device 102 with the authentication challenge sent by the authentication service 118 to the client device 102. If the comparison yields a match, then successful validation has been performed.

Assuming that validation is successful, the application-level authentication program 112 in the client device 102 derives (at 226) a master key, and similarly, the authentication service 118 in the authentication/payment server 106 derives (at 228) the master key. The master key is a shared secret between the client device 102 and the authentication/payment server 106, and can be used for encrypting further communications between the client device 102 and the authentication/payment server 106. Both the client device 102 and the authentication/payment server 106 can derive the master key using the authentication challenge as a seed. For example, the authentication challenge can be provided as a seed into a cryptographic function, which outputs the master key.

In accordance with some implementations of the present disclosure, before the authentication session terminates, a payment process can be performed. The payment process includes the payment service 120 in the authentication/payment server 106 sending (at 230) payment information to the client device 102. For example, the payment information can specify payment rates for access of a given service. For example, if the given service is a network access service, then the payment information can specify the rate to charge per unit amount of data transferred in a network connection. For example, the service contract of the network service provider for access to the network along with rate contract can be in the form of smart contract that can be presented to the client device 102. The payment information can be encrypted using the public key (KcPub) of the wireless device 102.

The payment program 114 in the client device 102 receives the payment information, and decrypts the payment information using the private key (KcPriv) of the client device 102. The payment program 114 in the client device 102 then sends a token (at 232) as payment to the authentication/payment server 106. The token can be signed using the private key (KcPriv) of the client device 102, and the signed token can be encrypted using the public key (KsPub) of the authentication/payment server 106. In some examples, the token can be referred to as an ether or cryptographic currency, which is a medium of payment that is cryptographically protected (e.g., signed with or encrypted by an encryption key). Signing the token with the private key (KcPriv) of the client device 102 allows the authentication/payment server 106 to verify that the token is actually sent by the client device 102.

The payment service 120 in the authentication/payment server 106 decrypts the token, and accesses (at 234) the blockchain network 110 to validate the token. The payment service 120 in the authentication/payment server 106 publishes the token to the blockchain network 110, which responds with an indication of whether or not the token is valid. Validating the token can include a blockchain node 122 (full node) in the blockchain network 110 publishing the token to the blockchain, which can respond with an indication of whether the token constitutes valid payment. For example, based on the transaction data of transactions maintained by the blockchain, the blockchain node 122 can determine whether or not the token was previously used. If so, then the token is not valid.

If the token is invalid, then the payment service 120 can reject the authentication request (sent at 212) from the client device 102.

Publishing a valid token for a current transaction to the blockchain also prevents the token from being reused again in the future. The token can be stored in a block of the blockchain as part of transaction data for the current transaction.

Assuming that the token is valid, the authentication service 118 in the authentication/payment server 106 sends an authentication success (at 236) to the client device 102. In examples where RADIUS and EAP are used, the authentication service 118 sends a RADIUS Authentication Success to the authenticator 116, which in turn sends an EAP success to the client device 102. In other examples, authentication success can be indicated using other messages, which can either pass through the authenticator 116 or can be sent directly from the authentication/payment server 106 to the client device 102.

In response to receiving the authentication success, the client device 102 sends a response to the authentication/payment server 106 that causes termination of the authentication session (at 238).

At a later time, the smart contract manager 132 (FIG. 1) can receive an indication from a service provider (of the service that is being accessed by the client device 102) of the amount of actual usage of the service. If the service is a network connectivity service, then the amount of actual usage can be indicated as the number of bytes communicated. The smart contract manager 132 determines (at 240) based on the received indication any refund to issue to the client device 102. For example, the token sent at 232 may be a payment for 10 gigabytes (GB) of usage. However, the actual usage may be 6 GB. In this case, the smart contract manager 132 can determine, by accessing a smart contract in the smart contract database 134, that the client device is to be refunded an amount corresponding to the 4 GB of unused bandwidth.

The smart contract manager 132 sends (at 242) the refund amount to the blockchain network 110. A blockchain node 122 in the blockchain network 110 publishes the refund amount (represented by a refund token) to the blockchain. Once confirmation is received from the blockchain network 110 that the refund amount has been successfully added to the blockchain network, then the smart contract manager 132 sends (at 244) the refund token to the client device 102. The client device 102 can use the refund token for future access of a service.

Thus, in accordance with some implementations of the present disclosure, if a user does not use the entirety of a service for which payment was made (e.g., the user partially uses the service), the authentication/payment server 106 can issue a refund to the user.

In alternate examples, instead of sending the payment information (at 230) in response to determining successful authentication of the client device 102, the authentication/payment server 106 can send, to the client device 102, a term of service that an entity associated with the client device 102 can choose to abide by. The term of service can be governed by a contract, such as a smart contract. If the entity chooses not to abide by the term of service, then the authentication/payment server 106 can deny access to the requested service.

In some examples, multiple terms of service along with respective qualities of service and corresponding monetary rates can be presented to the entity. For example, if the requested service is a network connectivity service, then the multiple terms of service can specify different network connection speeds, with higher monetary rates charged for higher connection speeds.

In response to the entity opting to accept a term of service (which can include selection of one of multiple terms of service), the authentication/payment server 106 can provide access to the requested service at the agreed to term of service. In examples where the term of service is included in a smart contract, the entity can accept the smart contract by digitally signing the smart contract. The smart contract can also include a payment term, and in response to the entity accepting the smart contract, the authentication/payment server 106 can implement the payment term of the smart contract for the access to the service. The authentication/payment server 106 can obtain payment for using the service according to the payment information in the smart contract.

In some examples, an escrow account can also be maintained, in which the entity requesting service (or another entity) can deposit money. The escrow account can be maintained by a service provider or by a neutral third party. Withdrawals can be made by the service provider from the escrow account as payment for usage of service, according to the agreed to term of service. Maintenance of the escrow account and payments into and withdrawals from the escrow account can be managed by the smart contract manager 132 (FIG. 1) according to a smart contract.

Figure 3:
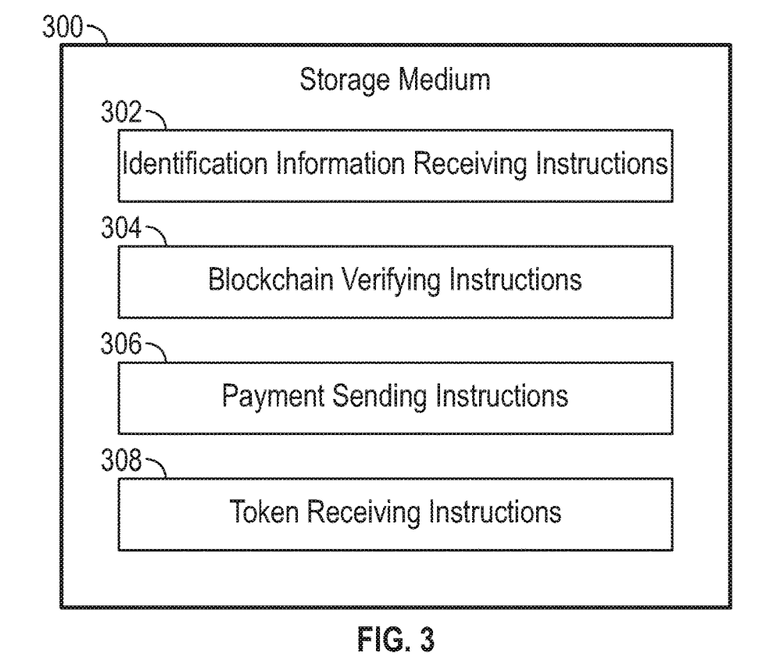
FIG. 3 is a block diagram of a storage medium storing machine-readable instructions according to some further examples.

FIG. 3 is a block diagram of a non-transitory machine-readable or computer-readable storage medium 300 storing machine-readable instructions that upon execution cause a server system to perform various tasks. The machine-readable instructions include the following instructions that are executable in an authentication session for authenticating an entity associated with a client device to access a service.

The machine-readable instructions include identification information receiving instructions 302 to receive, from the client device, identification information (e.g., a blockchain address) associated with the client device. The machine-readable instructions further include blockchain verifying instructions 304 to verify, using a blockchain network, an existence of the identification information. The machine-readable instructions also include payment sending instructions 306 to send, to the client device, payment information regarding payment for the service, and token receiving instructions 308 to receive, from the client device, a token as payment for the service.

Figure 4:
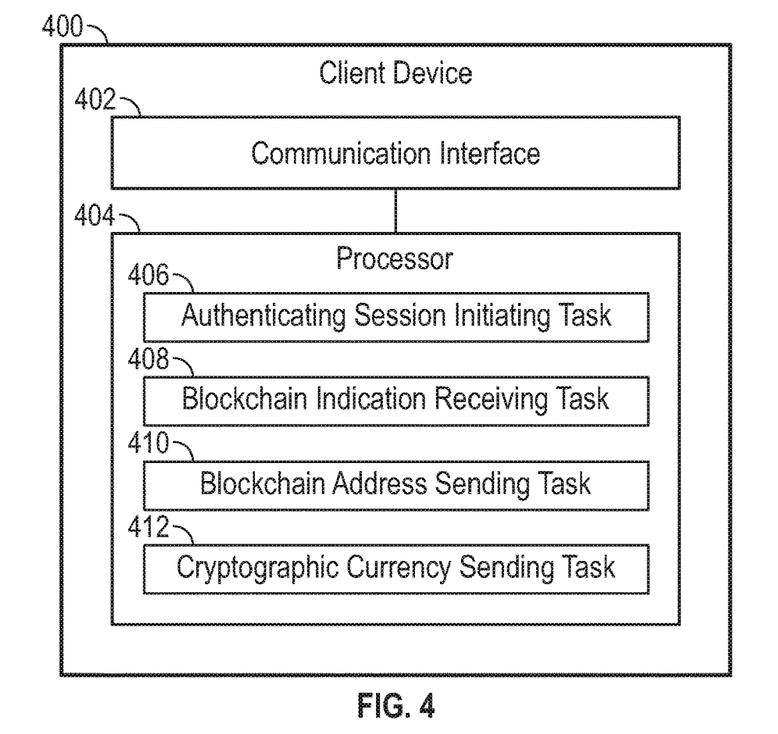
FIG. 4 is a block diagram of a client device according to additional examples.

FIG. 4 is a block diagram of a client device 400 according to further examples. The client device 400 can correspond to the client device 102 of FIG. 1. The client device 400 includes a communication interface 402 to communicate over a network, and a processor 404 to perform various tasks. A processor performing a task can refer to a single processor performing the task, or multiple processors performing the task.

A processor can include a microprocessor, a core of a multi-core microprocessor, a microcontroller, a programmable integrated circuit, a programmable gate array, or another hardware processing circuit.

The tasks include an authentication session initiating task 406 to initiate an authentication session with an authenticator to authenticate the client device for using a service. The tasks further include a blockchain indication receiving task 408 to receive, from the authenticator, an indication that a blockchain is to be used for authentication of the client device. The tasks additionally include a blockchain address sending task 410 to, in response to the indication, send, to an authentication/payment server in the authentication session, a blockchain address of the client device. The tasks further include a cryptographic currency sending task 412 to send, to the authentication/payment server in the authentication session, a cryptographic currency as payment for the service.

Figure 5:
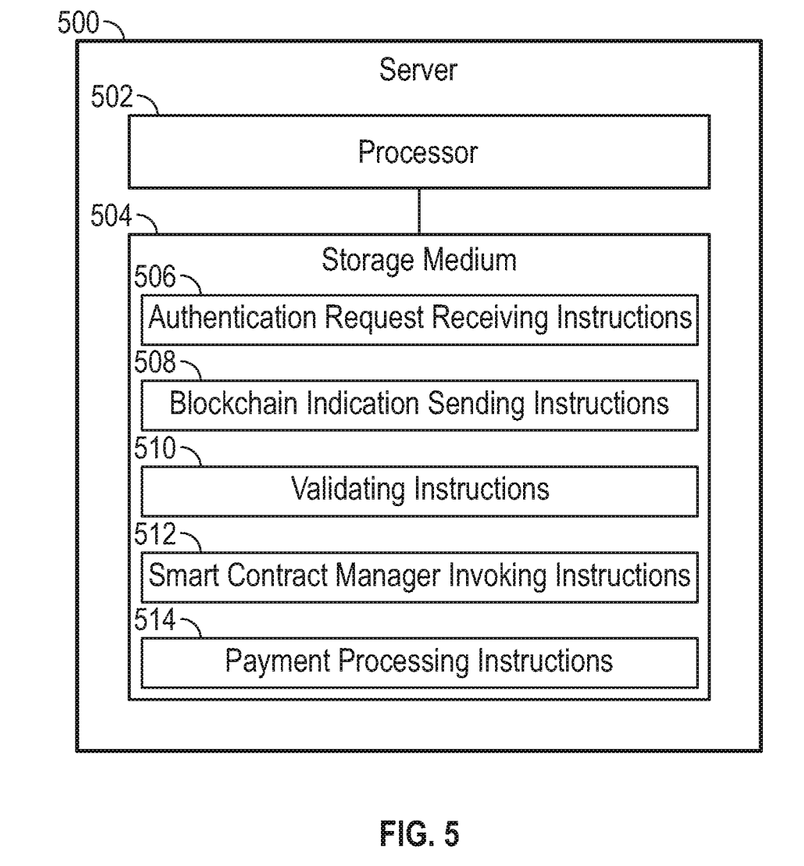
FIG. 5 is a block diagram of a server according to other examples.

FIG. 5 is a block diagram of a server 500 (implemented as a single computing node or a distributed arrangement of multiple computing nodes) including a processor 502 and a non-transitory storage medium 504 storing machine-readable instructions executable on the processor 502 to perform various tasks. Machine-readable instructions executable on a processor can refer to machine-readable instructions executable on one processor or on multiple processors.

The machine-readable instructions include authentication request receiving instructions 506 to receive, from a client device, an authentication request to initiate an authentication session for authenticating the client device. The machine-readable instructions further include blockchain indication sending instructions 508 to send, to the client device, an indication of use of a blockchain to authenticate the client device.

The machine-readable instructions further include validating instructions 510 to validate identification information of an entity associated with the client device using a blockchain network, the entity being part of a Distributed Autonomous Organization (DAO) that groups entities granted access to a service. The machine-readable instructions additionally include smart contract manager invoking instructions 512 to invoke a smart contract manager to propose a set of service contract options to the client device. The machine-readable instructions further include payment processing instructions 514 to process a payment and refund for use of the service by the client device using the blockchain network.

The storage medium 300 of FIG. 3 or the storage medium 504 of FIG. 5 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Storage can be located on premise, off premise, at a managed service provider, in a private or public cloud, or any combination thereof.

Note that the instructions discussed above can be provided on one computer-readable or machine-readable storage medium, or alternately, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium storing instructions that upon execution cause a server system to:

in an authentication session for authenticating an entity associated with a client device to access a service:
receive, from the client device, identification information associated with the client device;
verify, using a blockchain network, an existence of the identification information;
send, to the client device, payment information regarding payment for the service; and
receive, from the client device, a token as payment for the service.

2. The non-transitory machine-readable storage medium of claim 1, wherein the instructions upon execution cause the server system to further:
validate the token using the blockchain network.

3. The non-transitory machine-readable storage medium of claim 1, wherein the authentication session performs layer 2 authentication of the client device.

4. The non-transitory machine-readable storage medium of claim 1, wherein the instructions upon execution cause the server system to further:
receive, from the client device, a public key of the client device;
validate in the blockchain network if the public key is valid for a blockchain address of the client device; and
send, to the client device, an authentication challenge encrypted using the public key of the client device.

5. The non-transitory machine-readable storage medium of claim 4, wherein the authentication challenge is further encrypted with a private key of the server system.

6. The non-transitory machine-readable storage medium of claim 4, wherein the instructions upon execution cause the server system to further:
receive, from the client device, a response to the authentication challenge, the response including an encrypted version of the authentication challenge encrypted using a public key of the server system and a private key of the client device.

7. The non-transitory machine-readable storage medium of claim 6, wherein the instructions upon execution cause the server system to further:
in response to determining that the authentication challenge was successfully decrypted by the client device, send, to the client device, a success indication for the authentication session.

8. The non-transitory machine-readable storage medium of claim 7, wherein the sending of the payment information and the receiving of the token are performed by the server system in the authentication session after the receiving of the response to the authentication challenge and prior to the sending of the success indication.

9. The non-transitory machine-readable storage medium of claim 6, wherein the instructions upon execution cause the server system to further:
in response to determining successful authentication of the client device:
send, to the client device, a term of service that the entity associated with the client device can choose to abide by;
in response to the entity opting to accept the term of service, provide access to the service.

10. The non-transitory machine-readable storage medium of claim 9, wherein the term of service is included in a smart contract, and wherein accepting the term of service comprises accepting the smart contract, the instructions upon execution cause the server system to further:
in response to the entity accepting the smart contract, implement a payment term of the smart contract for the access to the service.

11. The non-transitory machine-readable storage medium of claim 9, wherein the instructions upon execution cause the server system to further:
establish an escrow account into which the entity is able to deposit money and from which a service provider of the service can withdraw money as payment for usage of the service; and
use a smart contract to maintain the escrow account.

12. The non-transitory machine-readable storage medium of claim 1, wherein the instructions that upon execution cause the server system to further:
send, to the client device, a payment refund in response to detecting partial use of the service.

13. A client device comprising:
a communication interface to communicate over a network; and
a processor to:
initiate an authentication session with an authenticator to authenticate the client device for using a service;
receive, from the authenticator, an indication that a blockchain is to be used for authentication of the client device;
in response to the indication, send, to an authentication/payment server in the authentication session, a blockchain address of the client device; and
send, to the authentication/payment server in the authentication session, a cryptographic currency as payment for the service.

14. The client device of claim 13, wherein the processor is to:
receive, from the authentication/payment server, a smart contract specifying a term of service and payment information that an entity associated with the client device can choose to abide by; and
accept the smart contract to allow the authentication/payment server to obtain payment for using the service according to the payment information in the smart contract.

15. The client device of claim 13, wherein the processor is to further:
send, to the authentication/payment server, a public key of the client device;
receive, from the authentication/payment server, an encrypted authentication challenge encrypted with the public key of the client device and a private key of the authentication/payment server;
decrypt the encrypted authentication challenge with a private key of the client device and a public key of the authentication/payment server, to produce a decrypted authentication challenge;
send, to the authentication/payment server, an encrypted version of the decrypted authentication challenge, the encrypted version of the decrypted authentication challenge encrypted using the private key of the client device and the public key of the authentication/payment server.

16. A server comprising:
a processor; and
a non-transitory storage medium storing instructions executable on the processor to:
receive, from a client device, an authentication request to initiate an authentication session for authenticating the client device;

send, to the client device, an indication of use of a blockchain to authenticate the client device;

validate identification information of an entity associated with the client device using a blockchain network, the entity being part of a Distributed Autonomous Organization (DAO) that groups entities that are granted access to a service;

invoke a smart contract manager to propose a set of service contract options to the client device; and process a payment and refund for use of the service by the client device using the blockchain network.

17. The server of claim 16, wherein at least a portion of the server is part of the blockchain network.

18. The server of claim 16, wherein the instructions are executable on the processor to:

maintain an escrow account into which an entity associated with the client device deposits a cryptographic currency, and from which the payment is withdrawn by a service provider.

19. The server of claim 18, wherein the depositing of the cryptographic currency into the escrow account, and the withdrawal of the payment from the escrow account, are governed by a smart contract.

20. The server of claim 16, wherein the set of service contract options is governed by at least one smart contract.

* * * * *